US010365482B1

(12) United States Patent
Stuppi et al.

(10) Patent No.: US 10,365,482 B1
(45) Date of Patent: Jul. 30, 2019

(54) LIGHT CONTROL SYSTEM

(71) Applicant: Rockwell Collins, Inc., Cedar Rapids, IA (US)

(72) Inventors: Albert N. Stuppi, Springville, IA (US); Brian W. Walker, Cedar Rapids, IA (US); Tracy J. Barnidge, Cedar Rapids, IA (US); Joseph L. Tchon, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 179 days.

(21) Appl. No.: 14/278,808

(22) Filed: May 15, 2014

(51) Int. Cl.
*G02B 27/01* (2006.01)

(52) U.S. Cl.
CPC ..... *G02B 27/0101* (2013.01); *G02B 27/0172* (2013.01); *G02B 2027/0112* (2013.01)

(58) Field of Classification Search
CPC . G02B 1/11; G02B 5/26; G02B 27/01; G02B 27/017
USPC ............... 359/359, 361, 586–589, 601, 614
See application file for complete search history.

(56) References Cited

U.S. PATENT DOCUMENTS

| 4,650,137 | A * | 3/1987 | Guill ..................... B64D 25/10 244/118.6 |
| 5,657,161 | A * | 8/1997 | Melograne ........... G02B 27/281 296/97.1 |
| 7,301,699 | B2 * | 11/2007 | Kanamori et al. ............ 359/449 |
| 2007/0046670 | A1 * | 3/2007 | Hedrick ................ G01C 23/00 345/440 |
| 2008/0297898 | A1 * | 12/2008 | Martin ............... G02B 27/0101 359/490.01 |
| 2010/0309097 | A1 * | 12/2010 | Raviv et al. ...................... 345/8 |
| 2011/0255303 | A1 * | 10/2011 | Nichol et al. ................. 362/606 |
| 2013/0187950 | A1 * | 7/2013 | Nowatzyk ..................... 345/633 |
| 2016/0187650 | A1 * | 6/2016 | Mills ....................... A42B 3/042 345/8 |

FOREIGN PATENT DOCUMENTS

| GB | 1381175 A | * | 1/1975 | ............. A62B 18/04 |
| WO | WO 9319393 A1 | * | 9/1993 | ............. G02B 5/289 |

\* cited by examiner

*Primary Examiner* — Wen Huang
(74) *Attorney, Agent, or Firm* — Angel N. Gerdzhikov; Donna P. Suchy; Daniel M. Barbieri

(57) ABSTRACT

The present disclosure is directed to a system for controlling light. The system may include a display. The display may include a light source configured to emit light having a specified spectral output. The system may also include a light filter applied to a substrate separate from the display. The light filter is configured to block light within the specified spectral output. The light filter is further configured to allow light outside of the specified spectral output to pass through the light filter.

17 Claims, 5 Drawing Sheets

US 10,365,482 B1

LIGHT CONTROL SYSTEM

TECHNICAL FIELD

The present disclosure generally relates to the field of light control and more particularly to systems and methods for light control using spectral separation techniques.

BACKGROUND

Canopy reflection poses potential problems in the cockpit during night time operations. For example, reflections on the canopy can obscure the pilot's vision of the space outside of the canopy, thus substantially reducing situational awareness. The geometry of each cockpit is different and some methods for managing canopy reflection might not work for the geometry of a particular cockpit. For example, for some cockpit geometries, polarization or modification of the backlight candela distribution is insufficient to correct the problem.

In vehicles with large reflective surfaces (e.g. aircraft that have both a front and back seat), the issue of stray light reflecting on the canopy is an issue. In addition, the inclusion of much larger liquid crystal displays (LCD) in the cockpit contributes to the reflection problem. Specifically, reflections may appear at dusk, dawn, or night from the front display in the area of the rear seated pilot that make it very difficult for the rear seated pilot to see out of the cockpit.

Therefore, there exists a need for improved systems and methods for controlling stray light in an aircraft.

SUMMARY

The present disclosure is directed to a system for controlling light. The system may include a display. The display may include a light source configured to emit light having a specified spectral output. The system may also include a light filter applied to a substrate separate from the display. The light filter is configured to block light within a specified spectral output. The light filter is further configured to allow light outside of the specified spectral output to pass through the light filter.

The present disclosure is further directed to a method for managing light in a cockpit of an aircraft. The method may include the step of emitting light from a display within a specified spectral output. The method may also include blocking light within the specified spectral output via a filter applied to a substrate, the substrate being separate from the display. The method may also include permitting light outside the specified spectral output to pass through the filter applied to the substrate.

The present disclosure is also directed to a system for controlling light in a cockpit of an aircraft. The system may include a first display configured to operate in at least a first mode and a second mode. The first mode may include light having a first specified spectral output and the second mode may include light having a second specified spectral output. The system may also include a second display configured to operate in at least a first mode and a second mode. The first mode may include light having the first specified spectral output and the second mode including light having the second specified spectral output. The system may also include a light filter applied to a substrate separate from the first display and the second display. The light filter may be configured to block light within the first specified spectral output. The light filter may be further configured to allow light outside of the first specified spectral output to pass through the light filter.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
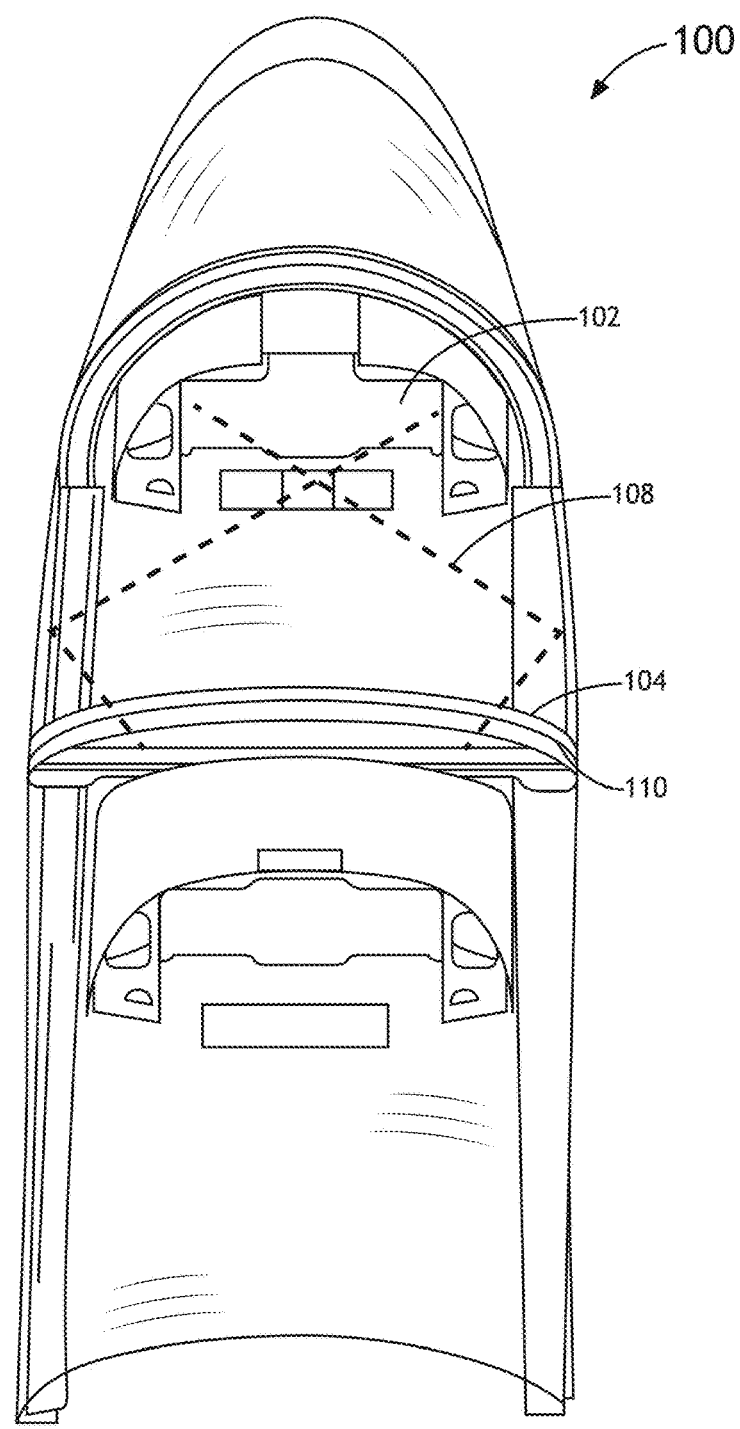
FIG. 1 is an aerial view of a cockpit of an aircraft including a filter for blocking light having a specified spectral output.

Referring generally to FIG. 1, a system 100 for controlling light in a cockpit of an aircraft is provided. The system 100 may include a display 102. The display 102 may include a light source configured to emit light having a specified spectral output. The system 100 may further include a light filter 104, the light filter applied to a substrate separate from the display 102. The light filter 104 is configured to block light 108 within the specified spectral output. The light filter 104 is further configured to allow light outside of the specified spectral output to pass through the light filter 104. Using the system 100, light 108 within the specified spectral output may be blocked without interfering with light falling outside of the specified spectral output.

Figure 2:
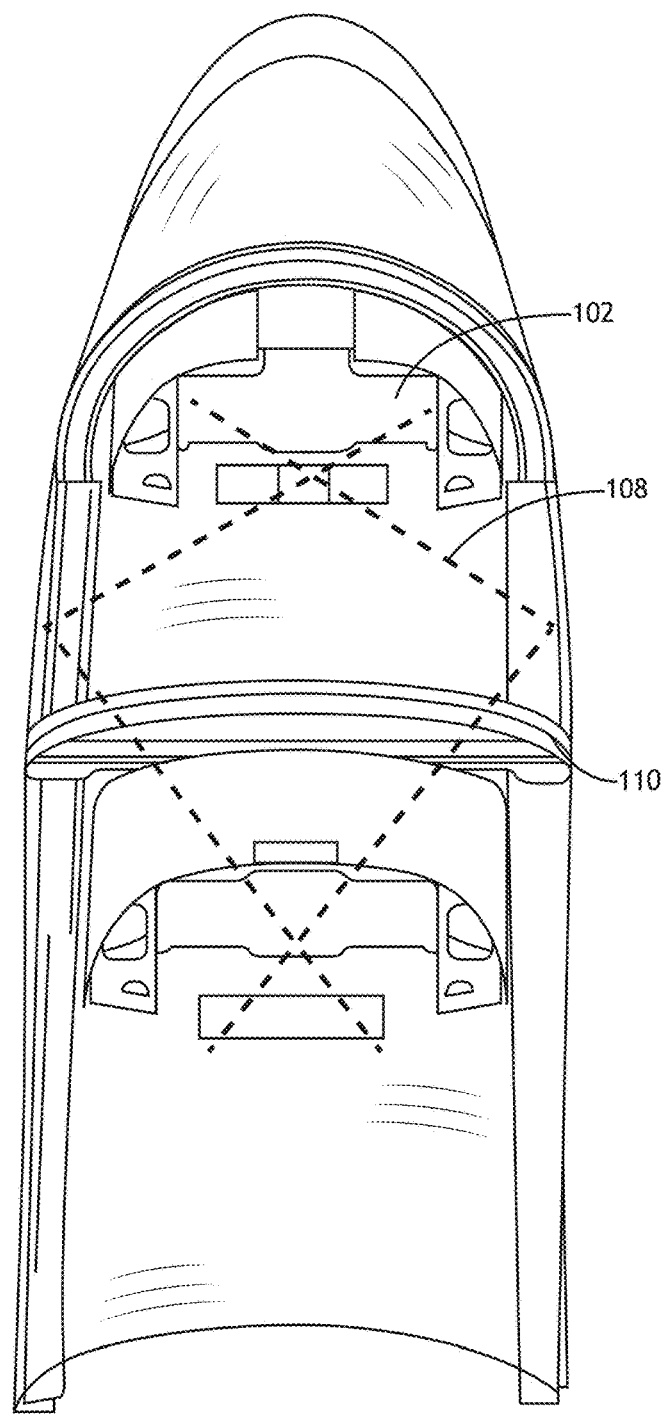
FIG. 2 is an aerial view of a cockpit of an aircraft showing how light rays may be reflected in the cockpit.

In the example implementation shown in FIG. 1, the system 100 may be used in the cockpit of an aircraft including a front seat and a back seat. In this implementation, the filter 104 may be applied to the blast shield 110 located between the front seat and the back seat. FIG. 2 shows the cockpit of the aircraft when no filter is applied and illustrates the path the light 108 may travel when it is emitted from the display 102 without any blocking from a filter. The light 108 is emitted from the display, reflected onto the side surfaces of the canopy of the aircraft and then reflected towards the view of the back seat. The reflected light 108 may create visibility problems for the pilot in the back seat. FIG. 1 shows the path the light 108 may travel when the filter 104 is applied to the blast shield 110. The light 108 travels from the display 102 and may reflect off of the side of the canopy of the aircraft towards the rear seat. The filter 104 applied to the blast shield 110 in this embodiment absorbs or blocks the light 108 and prevents it from traveling towards the rear seat.

Figure 3:
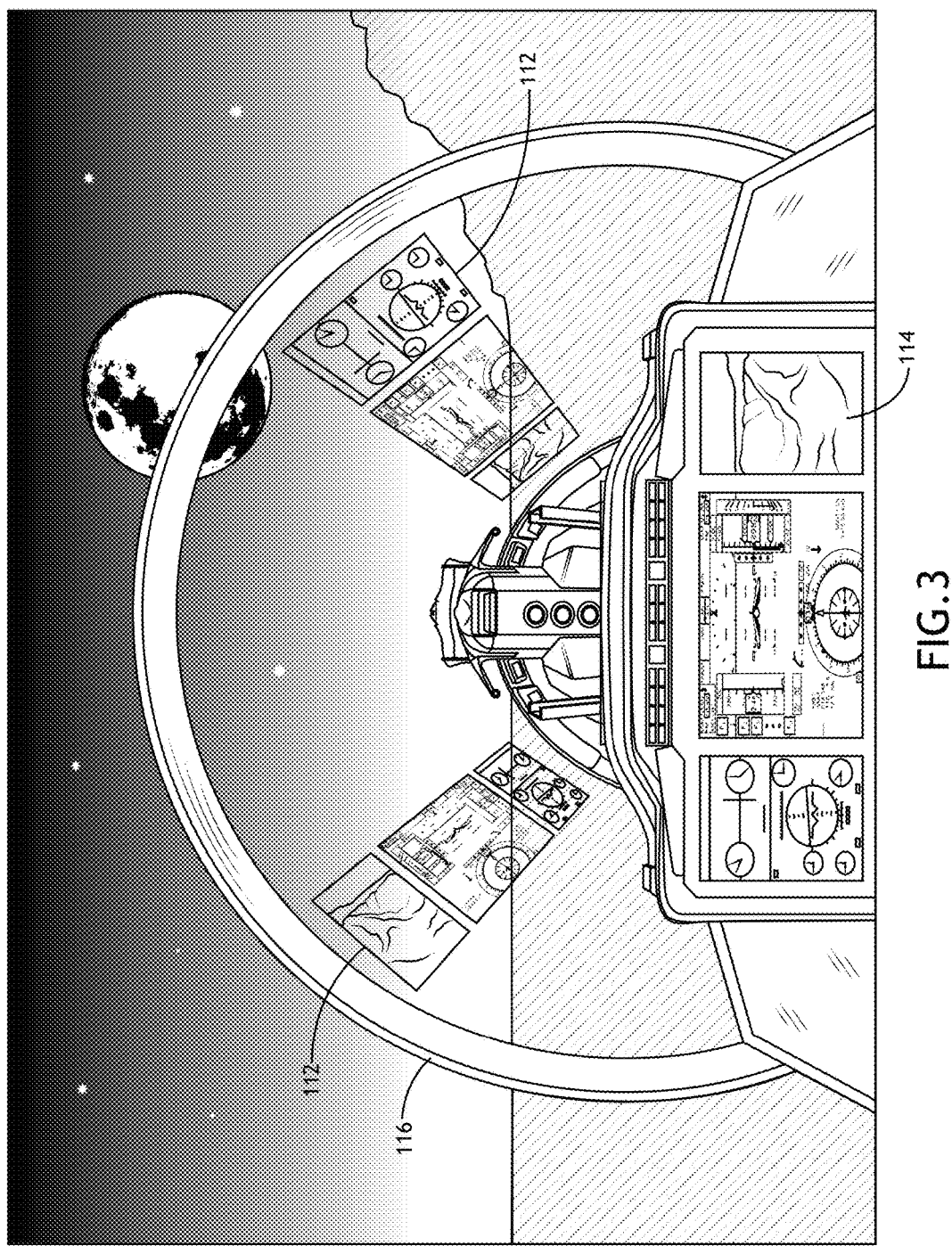
FIG. 3 is a view of a cockpit from a rear seat, the view including reflected images from a display in the front seat.
Figure 4:
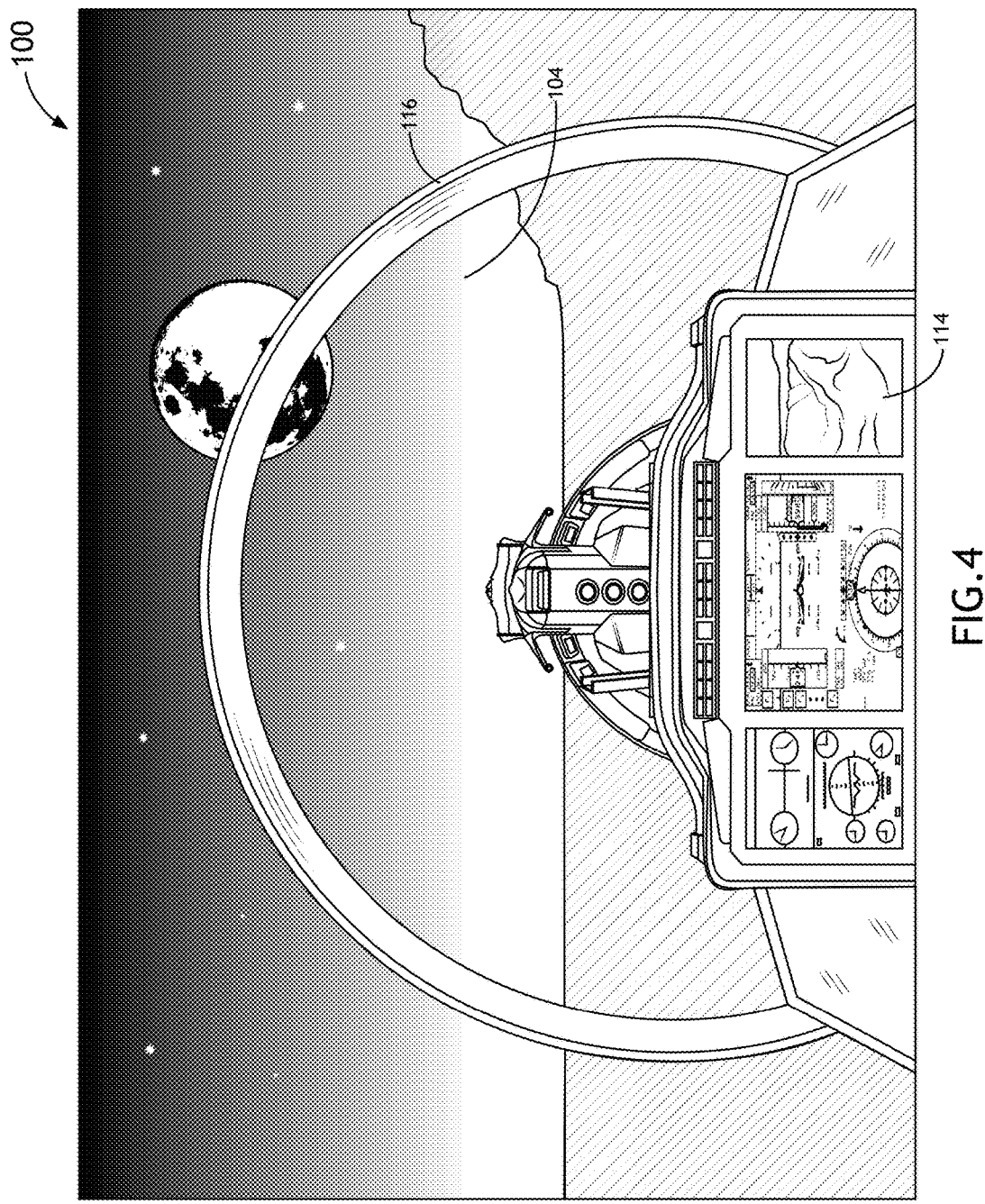
FIG. 4 is a view of a cockpit from a rear seat wherein a filter has been applied to block reflected images from the display in the front seat.

FIGS. 3 and 4 show another illustration of the system 100. For example, FIG. 3 demonstrates what the pilot in the rear seat may see when the system 100 has not been implemented and no filter 104 is applied to any substrate of the aircraft. As a result, reflections 112 from the display 102 of the front seat may appear on the canopy and create visibility problems for the rear seated pilot.

FIG. 4 shows the view from the rear seat of the aircraft when the system 100 has been implemented. The filter 104 in this embodiment may be applied either to the canopy 116 of the aircraft, or to the blast shield 110 in order to filter the light 108 having the specified spectral output emitted from the display 102. Light not having the specified spectral output emitted by the display 102 is not blocked by the filter 102, thus allowing ambient light and all other light to pass without interference.

The filter 104 may be applied to any substrate within the aircraft. For example, the filter 104 may be applied to the blast shield 110, or the canopy 116. The filter 104 may also be applied to a surface on eyewear (such as glasses, a visor or goggles) worn by the pilot. The filter 104 may also be applied to a windshield or window, or any other surface as may be desired for managing light within the cockpit.

The system 100 may use chromatic separation techniques as a tool for light control to address canopy reflection problems. In one embodiment, the filter 104 includes a trichromatic filter that is suitable for use in full color applications to maintain color coded information content on the display 102. The display 102 may include a narrowed tri-chromatic display source and the filter 104 that rejects the specified spectrum emitted from the display 102 but allows spectral content outside of these wavelengths to pass through. This may allow the pilot or operator to view the outside world and not lose his situational awareness.

The filter 104 may consist of a film or coating in some embodiments. The filter 104 may block the light having the specified spectral output through adsorptive and/or interference properties. The filter 104 and the display 102 are coordinated so that the filter 104 is configured to block light 108 within the specified spectral output provided by the display 102. For example, the filter 104 may include a trichromatic filter and the display 102 may emit narrow band trichromatic light. In another example, the filter 104 may include a monochromatic filter and the display 102 may emit monochromatic light. In yet another example, the filter 104 may include a multichromatic filter and the display 102 may emit multichromatic light. The filter 104 blocks the specified spectral output of the display 102 but allows light outside of the specified spectral output to pass through the filter 104.

The system 100 may also include additional displays. For example, in the embodiment shown in FIGS. 3-4, the system 100 includes the display 102 and may further include a second display 114. The spectral output of the second display 114 may vary depending on where the filter 104 is applied. For example, if the filter 104 is applied to the blast shield 110 or the canopy 116, then the spectral output may either be the same as the specified spectral output of the first display 102, or may have a different spectral output. In embodiments where the filter 104 is applied to the helmet, glasses, goggles, visor, or other eyewear of the rear seated pilot, the spectral output of the second display 114 will need to fall outside of the specified spectral output of the first display 102 in order to prevent filtering of the light from the second display 114. The different spectral outputs required for embodiments with more than one display may be accomplished by using multi-mode displays for which the spectral output may be controlled.

The system 100 may also be useful in providing stealth mode operation to aircraft and vehicles. For stealth applications, the system 100 may be used to help minimize the light emitted from the aircraft and make the aircraft less visible to others. For stealth applications, the display 102 as well as any second display 114 (or any additional displays or light sources within the aircraft) may be configured to emit light having the specified spectral output and the filter 104 may be applied to the entire canopy of an aircraft, or windshield of a vehicle or aircraft, as well as windows. In these applications, the light 108 emitted from the display 102 and any second display 114 will be blocked from emitting outside of the aircraft or vehicle, but light outside of the specified spectral output will not be affected.

The display 102 may include any suitable display for which the spectral output may be controlled. In one embodiment, the spectral output of the display 102 may be controlled by applying a filter to the display 102. The filter applied to the display 102 may be configured to filter the light to the narrow band of light that will be blocked by the light filter 104. In another embodiment, the spectral output of the display 102 may be controlled through the use of multiple light sources, including light sources having the specified spectral output as well as light sources including a different, or at least partially different, spectral output. A combination of light sources providing different spectral outputs and filters applied to the display 102 may also be used to control the spectral output of the display. This may allow the display 102 to operate in multiple modes, depending on the conditions. For example, if stealth operation is desired, the display 102 may be configured to operate with the light sources having the specified spectral output. Similarly, if it is a time of low-light operation (such as dawn, dusk or evening) and the display 102 is causing reflections 112, the display 102 may operate with the light sources having the specified spectral output. In addition, if it is daylight, the display 102 may operate in a mode with light sources that emit completely outside of, or only partially within the specified spectral output as reflections may not be an issue during daytime operation.

The different modes of operation of the display 102 may be provided by the use of different types of light sources within the display 102. For example, the light sources may include Light-emitting diodes (LEDs), such as white, red, blue, or green LEDs. The light sources may include multiple arrays of different types of light sources to provide different operational modes.

The display 102 may include a single display or multiple displays. The display 102 may include a liquid crystal display (LCD), a touch screen display, a multi-touch screen display, a head-up display, a head-down display, a 3-dimensional display, or a combination of different display types.

The system 100 may be fully compatible with Night Vision Imaging Systems (NVIS) and Short-Wave Infrared Systems (SWIR). For example, the specified spectral output that the display 102 is configured to emit is coordinated with the type of filter 104. When determining what spectral output is desired from the display 102, the particular wavelengths selected will take into account whether an NVIS filter or SWIR filter may be included. For example, if the display 102 is an NVIS or SWIR compatible display, the system 100 could be implemented with the NVIS or SWIR compatible display.

The system 100 may be implemented in any context where light control within a vehicle is desired, or where limited visibility of interior lighting is desired (for example, in covert operations). Examples may include aircraft such as fighter jets, commercial jets, helicopters, etc. as well as vehicles such as cars, trucks, vans, etc.

Figure 5:
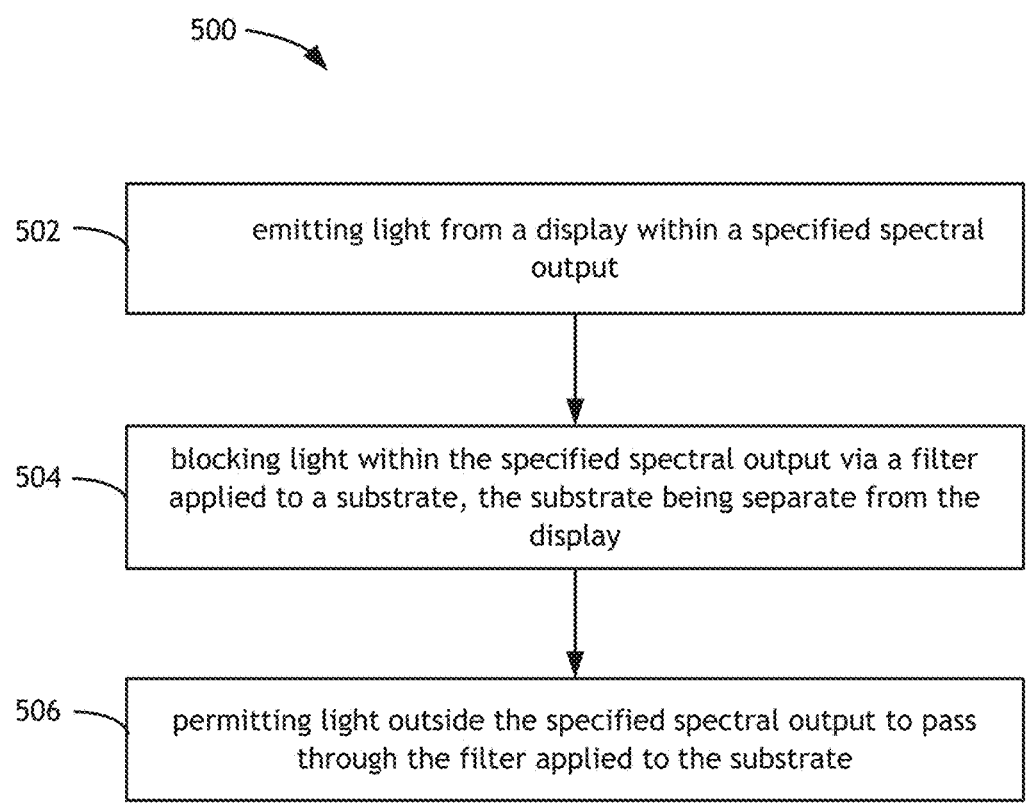
FIG. 5 is a method flow chart of a method for managing light in a cockpit.

The present disclosure is also directed to a method 500 for managing light in a cockpit of an aircraft as shown in FIG. 5. The method 500 may be implemented using the system 100. A step 502 of the method may include emitting light from a display within a specified spectral output (e.g. via the display 102). A step 504 may include blocking light within the specified spectral output via a filter (e.g., via filter 104) applied to a substrate, the substrate being separate from the display. A step 506 of the method 500 may include permitting light outside the specified spectral output to pass through the filter applied to the substrate.

The systems and methods of the present disclosure may provide several advantages. For example, chromatic separation can be used as a tool for light control in addressing canopy reflection problems. This technique may utilize a narrowed tri-chromatic display source and a blocking filter that rejects the spectrum emitted from the display but allowing spectral content outside of these wavelengths to pass through. This technique can allow a pilot good visibility of the outside world and avoid any loss of situational awareness of what lies outside the cockpit.

In addition, the systems and method of the present disclosure are fully compatible with NVIS and SWIR filtering methods and can be combined. This provides a range of functionalities depending on the time of day, lighting, and operational conditions.

Furthermore, the systems and method of the present disclosure may have covert applications. For example, the systems and method may be used to make an aircraft or vehicle covert by greatly minimizing the light that leaks out of the cockpit, windshield, or windows.

The systems and methods of the present disclosure may also be useful at low brightness levels by shifting the light output of the display(s) to specific bands that are blocked by the filter as applied on the blast shield, or other suitable substrate such as a visor. The narrow bands emitted by the display(s) may not be visible in reflectance but, the outside view will not be greatly impaired for the front pilot, rear pilot, or both pilots.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

What is claimed is:

1. A system for controlling light, comprising:
   a vehicle display including a light source configured to emit light with wavelengths having a specified spectral output; and
   a light filter utilizing chromatic separation techniques applied to a substrate separate from the display, the light filter coordinated with the display to: (i) block light with wavelengths within the specified spectral output and light with wavelengths reflected off a left side or a right side of an interior of a vehicle, (ii) reduce an amount of the light with wavelengths having the specified spectral output within the vehicle, and (iii) allow light with wavelengths outside of the specified spectral output to pass through the light filter,
   wherein the substrate includes a surface of a canopy mounted blast shield of an aircraft separating a first pilot from a second pilot.

2. The system of claim 1, further comprising a visor and eyewear having a surface comprising the applied light filter.

3. The system of claim 1, wherein the substrate further includes a further comprising the canopy of the aircraft having a surface comprising the applied light filter.

4. The system of claim 3, wherein the vehicle display includes a trichromatic display that emits trichromatic light and the light filter includes a trichromatic filter to block or absorb the trichromatic light that is reflected off a left side or a right side of the canopy.

5. The system of claim 1, wherein the display includes at least one of: a Night Vision Imaging System (NVIS) filter or a Short-Wave Infrared System (SWIR) filter.

6. The system of claim 1, wherein the substrate comprises a portion of a blast shield of an aircraft and the specified spectral output comprises a first specified spectral output, and the system further comprises:
   a second vehicle display including a second light source, the second light source configured to emit wavelengths of light having a second specified spectral output, wherein the second specified spectral output is outside the first specified spectral output, allowing the wavelengths of light having the second specified spectral output to pass through the blast shield of the aircraft.

7. The system of claim 3, further comprising:
   a second display, the second display including a second light source, the second light source configured to emit light with wavelengths having the specified spectral output.

8. The system of claim 1, wherein the display comprises at least one of a head-down display (HDD) and a head-up display (HUD).

9. A method for controlling light in an aircraft, comprising:
   emitting light with wavelengths from a vehicle display of a vehicle within a specified spectral output;
   coordinating a light filter utilizing chromatic separation techniques with the vehicle display to: (i) block light with wavelengths within the specified spectral output and reflected off a left side or a right side of an interior of the vehicle via application of the light filter to a substrate separate from the display, (ii) reduce an amount of the light with wavelengths having the specified spectral output within the vehicle, and (iii) permit wavelengths of light outside the specified spectral output to pass through the light filter; and
   blocking light within the specified spectral output from exiting a canopy of the aircraft via a canopy light filter to stealth operations,
   wherein the substrate includes a surface of a canopy mounted blast shield of an aircraft separating a first pilot from a second pilot.

10. The method of claim 9, further comprising a visor and eyewear having a surface comprising the applied light filter.

11. The method of claim 9, wherein the vehicle display comprises an aircraft display having a trichromatic light source emitting a light having a trichromatic band and the light filter includes a trichromatic filter to block or absorb the light having a trichromatic band reflected off a left side or a right side of the canopy.

12. The method of claim 9, further comprising:
emitting light with wavelengths from a second display within the specified spectral output.

13. The method of claim 12, wherein the specified spectral output comprises a first specified spectral output and the substrate is applied to a blast shield of an aircraft, the method further comprising:
emitting light with wavelengths having a second specified spectral output from the second display, the second specified spectral output being at least partially outside the first specified spectral output; and
coordinating the light filter with the second display to permit the light with wavelengths having the second specified spectral output to pass through the blast shield of the aircraft.

14. A system for managing light in an aircraft, comprising:
a first aircraft display, the first aircraft display configured to operate in at least a first mode and a second mode, the first mode comprising emitting light with wavelengths having a first specified spectral output, the second mode comprising emitting light with wavelengths having a second specified spectral output, the second specified spectral output being at least partially outside the first specified spectral output;
a second aircraft display, the second aircraft display configured to operate in at least the second mode to emit light with wavelengths having the second specified spectral output; and
a light filter utilizing chromatic separation techniques applied to a substrate separate from the first aircraft display and the second aircraft display, the substrate comprising a portion of a canopy mounted blast shield, separating a first pilot from a second pilot, of the aircraft, the light filter coordinated with the first aircraft display and the second aircraft display to: (i) block light with wavelengths within the first specified spectral output and the light with wavelengths within the first specified spectral output that are reflected off a left side or a right side of the canopy, (ii) reduce an amount of the light with wavelengths having the first specified spectral output within the aircraft, and (iii) allow light with wavelengths outside of the first specified spectral output to pass through the light filter, the canopy, and the blast shield of the aircraft.

15. The system of claim 14, wherein the light filter comprises a chromatic light filter film.

16. The system of claim 14, wherein the first display includes at least one of: a Night Vision Imaging System (NVIS) filter or a Short-Wave Infrared System (SWIR) filter for operating in the first mode.

17. The system of claim 16, wherein the second aircraft display is further configured to operate in the first mode, wherein the second vehicle display includes at least one of: a second NVIS filter or a second SWIR filter, and wherein the first specified spectral output includes light with wavelengths emitted from the NVIS filter, the SWIR filter, the second NVIS filter, or the second SWIR filter.

* * * * *